No. 738,620.  
PATENTED SEPT. 8, 1903.  
P. J. MAUGER.  
DUMPING AND ELEVATING APPARATUS.  
APPLICATION FILED FEB. 17, 1903.  
NO MODEL.  
6 SHEETS—SHEET 3.

No. 738,620. PATENTED SEPT. 8, 1903.
P. J. MAUGER.
DUMPING AND ELEVATING APPARATUS.
APPLICATION FILED FEB. 17, 1903.
NO MODEL. 6 SHEETS—SHEET 5.

WITNESSES:
INVENTOR
Philip J. Mauger
BY
ATTORNEYS.

No. 738,620. Patented September 8, 1903.

UNITED STATES PATENT OFFICE.

PHILIP JACOB MAUGER, OF MINIER, ILLINOIS.

DUMPING AND ELEVATING APPARATUS.

SPECIFICATION forming part of Letters Patent No. 738,620, dated September 8, 1903.

Application filed February 17, 1903. Serial No. 143,747. (No model.)

*To all whom it may concern:*

Be it known that I, PHILIP JACOB MAUGER, a citizen of the United States, residing at Minier, in the county of Tazewell and State of Illinois, have made certain new and useful Improvements in Dumping and Elevating Apparatus, of which the following is a specification.

My invention is an improvement in that class of apparatus employed for discharging or dumping grain or other commodity or material from a wagon or cart into a conveyer or chute, by which it is delivered into a permanent storage-receptacle or into a car, boat, or other medium of transportation.

The novel features are hereinafter described together with others required to form a complete apparatus.

In the accompanying drawings, six sheets, Fig. 2ª is a side view illustrating the dumping operation.

I will first indicate in a general way the main parts of the apparatus and then describe details.

A indicates a wagon which is run upon the dump proper, B, consisting of flanged tracks made in sections and hinged together. B' indicates uprights used in hoisting the hinged sections of the dump B, whereby the wagon A is elevated at its front end, as shown by dotted lines, Fig. 2.

C is the conveyer, D the elevator connected therewith, and E sheers which furnish a support for both the elevator and conveyer.

Figure 6:
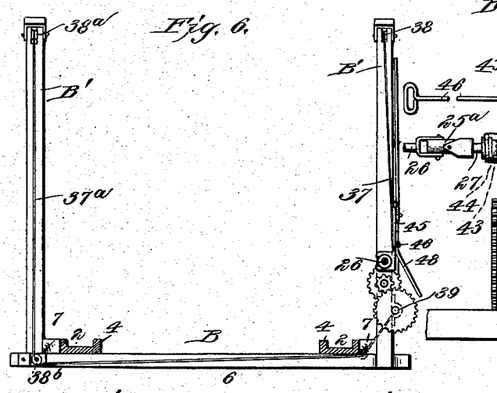
Fig. 6 is a cross-section on the line 6 6 of Fig. 1.

The dump proper, B, consists of track-sections or rails 1 and 2, the same being hinged together at 3 and also provided with side flanges 4, (see Figs. 2, 5, and 6,) which serve to guide the wheels of the wagon and prevent them running off laterally. Hinged inclines 5 are provided at the forward or front end of the dump, the same being preferably partly buried in the ground and suitably inclined to enable a wagon to pass easily up on the dump proper, B. Similar sections 5ª are provided at the opposite or rear end of the dump B to enable the wagon to pass off the dump without serious difficulty. The rails or track-sections 1 2 are suitably secured to cross-ties 6, arranged at suitable distance apart. These ties are in turn permanently and rigidly connected by means of sleepers or longitudinal bars 7, (see Figs. 3, 4, and 6,) the same being located alongside the tracks 1 2 and parallel thereto. It will be understood that the track-sections or rails 2 are not secured to the cross-ties 6, but merely jointed to the track-sections 1 and their outer ends resting normally upon the cross-tie which is located at the forward or rear end of the dump.

Figure 1:
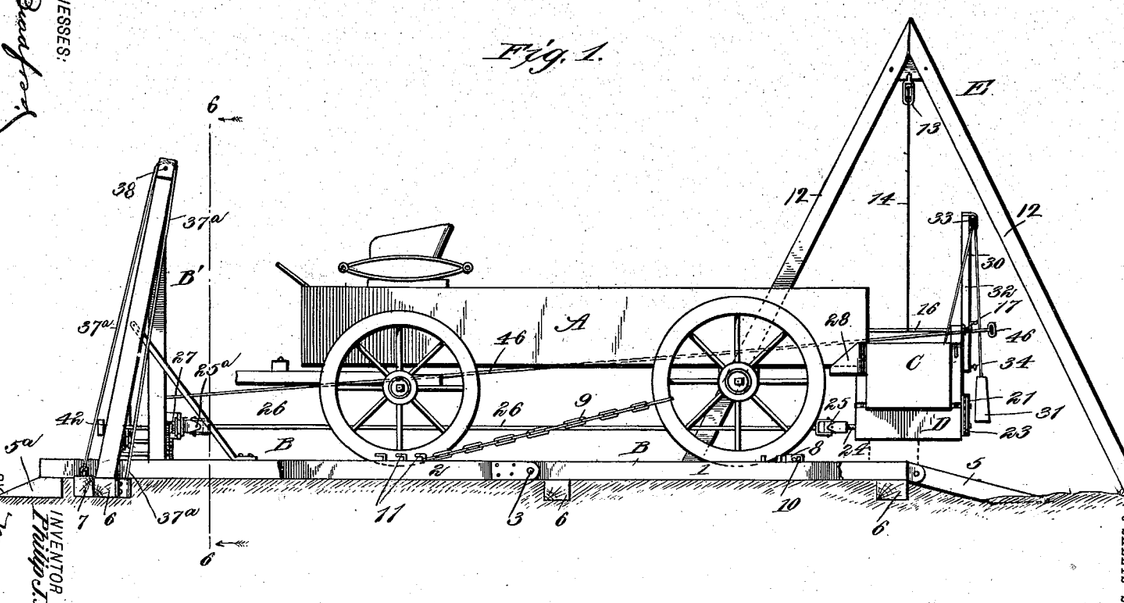
Figure 1 is a side view of the apparatus, including a wagon suitably placed for dumping its contents.
Figure 2:
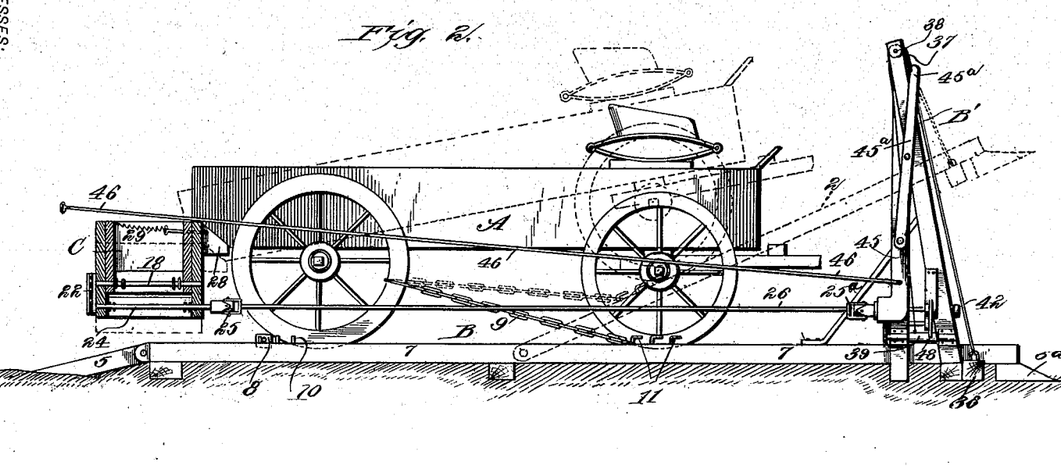
Fig. 2 is mainly a side view, a portion being in section, the view being taken from the opposite side to that represented in Fig. 1.
Figure 3:
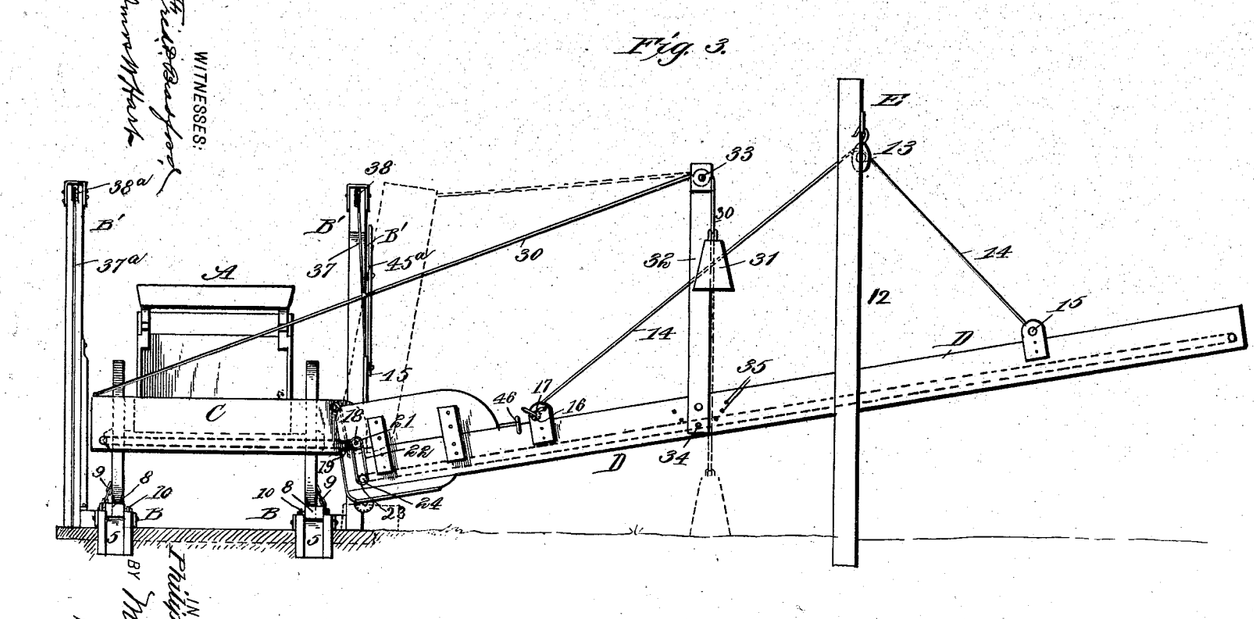
Fig. 3 is an end elevation of the apparatus.
Figures 4, 5:
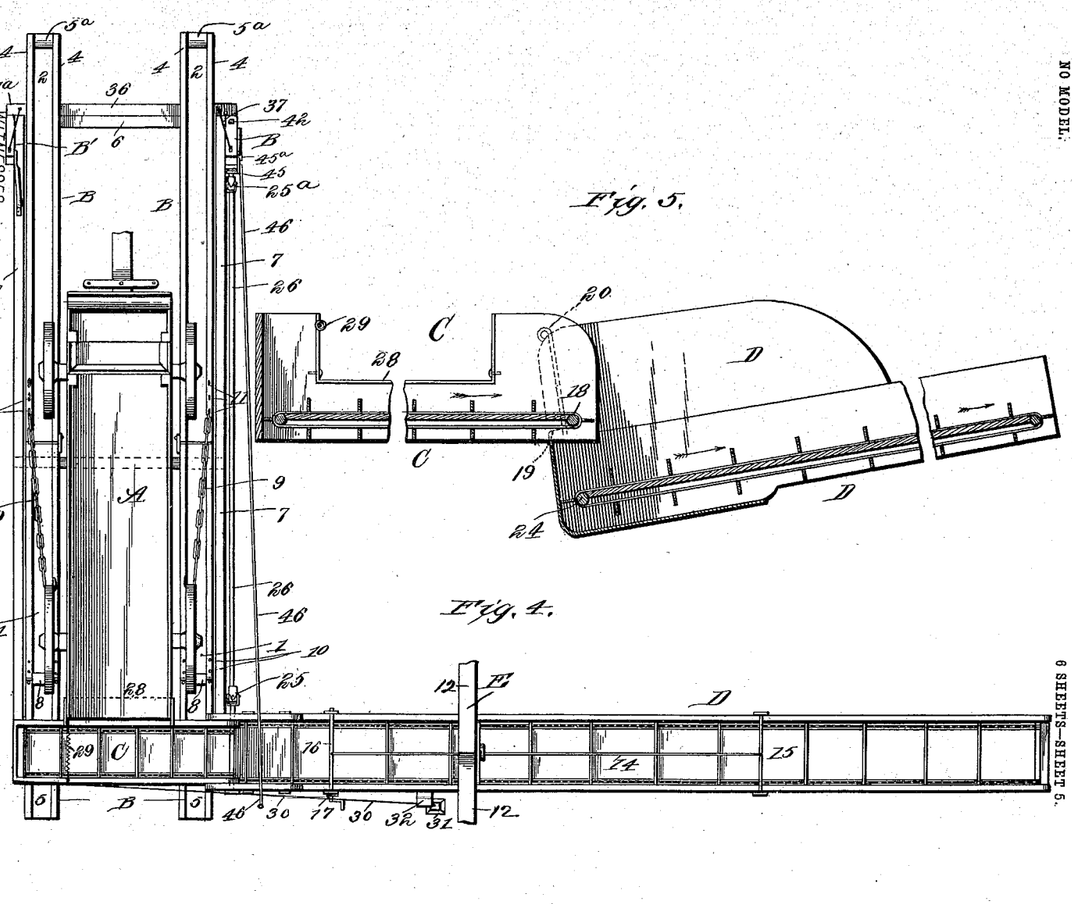
Fig. 4 is a plan view of the apparatus.
Fig. 5 is a longitudinal section of the conveyer and elevator 30 proper.

A wagon A loaded with grain is run upon the tracks of dump B, as indicated in several figures, and so located thereon that its rear wheels rest upon the rails or track-sections 1 while its front wheels rest upon the rear rails or track-sections 2. The wagon is then secured in position by means of blocks 8 and a chain 9. (See especially Figs. 1 and 4.) The said blocks are of such length that they lie between the flanges 4 of the track-section 1 and are provided at their ends with pins adapted to engage studs or pins 10, which are fixed in the side flanges of the rails. There being a series of pins 10, it is apparent that the blocks, which constitute chocks, may be adjusted as required for wagons of different lengths. The chains 9 are hitched on hooks 11, fixed in the side flanges 4 of the rear track-sections 2, and provided at their other extremities with hooks adapted to engage the fellies of the rear wheels. It is apparent that by this means wagons of different lengths may be held securely in the required position. The rear ends of the rear track-sections 2 are then elevated in order to incline the wagon, as shown in Figs. 2 2ª, to cause discharge of the grain by gravity, which operation will be more fully described hereinafter. The grain discharged from the wagon A is delivered into a conveyer C, which consists of a trough closed at one end and open at the other and provided with an endless belt having cross-bars, which belt is driven by means hereinafter described. The said conveyer C is jointed to the elevator proper, D, which is also a trough closed at its lower end and having, like the conveyer C, an endless traveling belt provided with cross-bars. The means for supporting these two parts C and D are as follows: In practice a block or blocks or other suitable removable support (not shown) is placed under the lower end of the elevator D, or it may be allowed to rest on the ground, as conditions require. For supporting the outer end of the elevator sheers E are erected at a point not far removed from the dump proper, B, and parallel thereto. The said sheers consist of two legs or masts 12, which are suitably connected at the top. The elevator D is suspended from the apex of the sheers E by means of a block 13 and a rope 14, whose ends are attached, respectively, to a stirrup 15 and a winding-shaft 16, which are suitably connected with the sides of the elevator. (See Fig. 1.) The winding-shaft 16 is provided at one end with a crank-arm by which it may be rotated and also with locking mechanism 17, comprising a ratchet-wheel and pawl. (See Fig. 3.) The rope 14 runs free through the block 13, and by rotating the shaft 17 it may be taken up or let out as required for adjusting the elevator D higher or lower or at different vertical angles, as may be required to deliver the grain at a higher or lower point. It will be understood that the outer end of the elevator D will in practice project into a car-door or into or over any other receptacle for the grain or other commodity. The conveyer C is connected with the elevator D by means of a cross-shaft 18. (See especially Figs. 3 and 5.) This cross-shaft is arranged in open slots or notches 19, formed in the lower end of the elevator D, and is secured detachably by means of removable pins 20, which are inserted vertically in openings provided in the frame of the elevator. The said shaft 18 is provided at one end with a sprocket-wheel 21, (see Figs. 1 and 3,) from which wheel a chain belt 22 runs to a sprocket-wheel 23, mounted on the contiguous end of a counter-shaft 24. The latter, as shown in Fig. 5, is journaled in the lower corner of the conveyer D, and the endless traveling belt of the latter runs thereon. As shown in Figs. 1, 2, 4, the opposite end of the shaft 24 is connected by a universal joint 25 with a tumbling rod or shaft 26, which is similarly connected at its opposite end by means of a universal joint 25ª with a driving-shaft 27, the latter being suitably journaled in the vertical support or framework B'. It will now be apparent that if the tumbling-shaft 26 be driven, like rotation will be imparted to the shaft 24 in the elevator D, and through the medium of the sprockets 21 and 23 and chain belt 22 rotation will be imparted to the shaft 18 and therethrough to the endless belt of conveyer C. Thus grain or other commodity or material delivered from the wagon into conveyer C will be conveyed to the elevator D and be delivered into a car or other receptacle.

Figure 12:
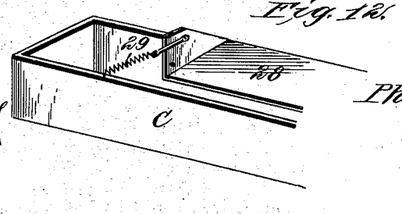
Fig. 12 is a perspective view of a portion of the conveyer proper, together with its hinged side chute.

The means for applying or connecting the conveyer C with the wagon-body are as follows: As shown in Figs. 5 and 12, one side of the conveyer C is cut out, and a chute 28 is hinged in the recess thus provided. The said chute is formed of a metal plate having its ends bent up and beveled, as shown. A spiral spring 29 (see Fig. 12) connects one of the ends or wings with the opposite side of the conveyer. A spiral spring tends to hold the free or outer edge of the chute 28 pressed upward against the under side of the body of the wagon A. It will be understood that in practice the length of the chute 28 will be such as to accommodate wagon-bodies of different widths. In this instance the chute is shown (see Fig. 4) as of just sufficient length to receive the wagon-body. It is manifest that means must be provided for supporting the conveyer C in proper position to deliver grain to the elevator D and also to hold the chute 28 duly pressed upward against the wagon-body. For this purpose I employ (see Fig. 3) a rope 30, a weight 31, which is attached to its free end, and a vertical post or bar 32, which is pivoted to the side of the elevator D and provided with means for locking it at different inclinations. The rope 30 passes over a sheave 33, journaled in the top of the bar 32. A locking-pin 34 passes through the lower end of the bar 32 and is adapted to enter any one of a series of holes 35, which are arranged in the arc of a circle and in the side of the conveyer D. The weight 31 is in practice designed to be of sufficient size to enable it to support the outer or free end of the conveyer C, so that the chute 28 will be held pressed upward against the wagon-body. The vertical angle of the bar 32 may be shifted as required to adapt it to support the weighted rope in the required manner, and when the apparatus is not in use, the locking-pin 34 being withdrawn, the bar 32 may be folded down alongside the elevator D.

Figure 7:
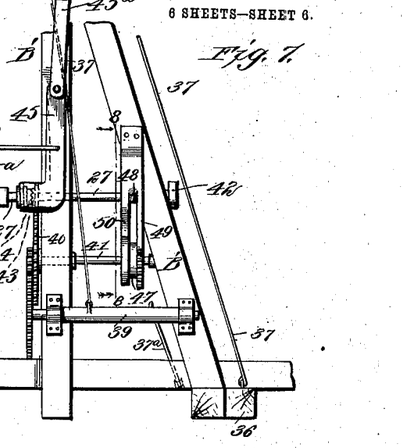
Fig. 7 is an elevation of hoisting mechanism proper by which the dump proper is raised and lowered.
Figures 9, 10:
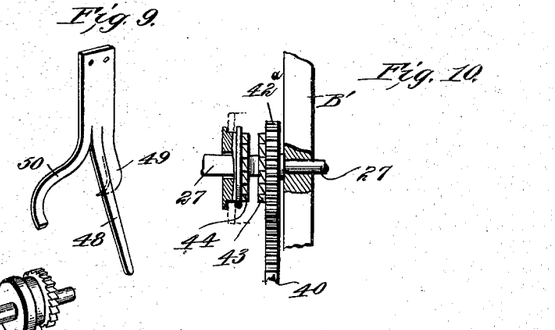
Fig. 9 is a perspective view of the parts of the locking-and-braking mechanism disassociated.
Fig. 10 is a partly-sectional view illustrating a clutch by which the hoisting mechanism may be operatively connected with the conveyer and elevator.

I will now describe in detail the means for elevating the outer track-sections 2 as required to dump the contents of the wagon A and for driving the endless belt of the conveyer C and elevator D. A cross-bar 36 (see Fig. 4) connects the outer ends of the track-sections 2. To one end of such bar is connected a rope 37, which passes up over a sheave 38, journaled in one of the posts or uprights B', and extends thence down to a winding-shaft 39. (See Figs. 6 and 7.) Another rope 37ᵃ is connected with the other end of the cross-bar 36 and passes over a sheave 38ᵃ in the left-hand upright B', (see Fig. 6,) thence down over a sheave 38ᵇ, thence across beneath the track-sections 2 to the winding-shaft 39. It is apparent that if the latter be rotated the outer ends of the track-sections 2 may be raised. The winding-shaft is suitably geared with the driving-shaft 27. For this purpose multiple gearing 40 is employed, and one of the gears is mounted on an intermediate counter-shaft 41. The shaft 27 is driven by any suitable motor, and for this purpose its outer end will be suitably provided with a pulley 42 or gear or any other device adapted for connecting it with the motor. While the apparatus is in use it is supposed that the endless belt of the conveyer C and elevator D will be constantly driven through the medium of the tumbling-shaft 26 and driven shaft 24. The latter may be thrown into gear with the winding-shaft 39 at will. For this I provide a clutch-and-gear mechanism, as will now be described. Referring especially to Fig. 10, a spur-gear 42ᵃ is mounted loose on the driving-shaft 27 and meshes with one of the train-gears 40. On its left-hand side is formed a half-clutch 43. On the adjacent and square portion of the shaft 27 is arranged a slidable half-clutch 44, which is adapted to engage clutch 43. As shown in Fig. 7, a lever 45 is pivoted to the upright B', and its bent lower end is suitably connected with the slidable clutch 44 in a well-known manner. A second lever member 45ᵃ is pivoted to the upright B', and its lower end is jointed to the bent member 45. Thus the two members form practically a compound lever. It is apparent that by duly adjusting said lever the clutches may be engaged or disengaged at will. For this purpose I employ a rod 46, which is attached to a vertical bar or lever 45 and extends in practice (see Fig. 4) across the elevator D, so that its outer end may be conveniently seized by the operator stationed at that point. The track-sections 2 are shown raised part way in Fig. 2 and to the highest point in Fig. 2ᵃ. In the latter case the cross-bar 36, attached to the outer ends of tracks 2, strikes the upper end of lever 45ᵃ, (see Fig. 2ᵃ,) and thus the clutch is released automatically.

Figure 8:
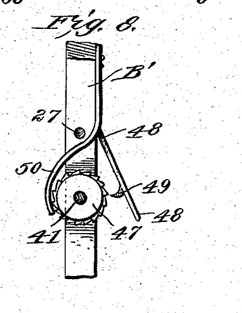
Fig. 8 is a detail section illustrating the means for locking and braking the hoisting mechanism.
Figure 11:
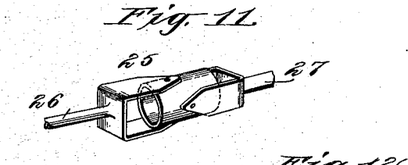
Fig. 11 is a perspective view of a universal shaft-coupling employed as part of the apparatus.

I will now describe and recapitulate the operation of the apparatus. Before the wagon A, loaded with grain or other article, is driven upon the track-sections the conveyer C is turned up into vertical position, as shown by dotted lines in Fig. 3. It will be understood that for this purpose traction may be applied to the weighted rope 30 and that when the conveyer C is elevated the weight will be sufficient of itself to hold the conveyer. The wagon A is now driven upon the track-sections and suitably locked in place by means of the chock 8 and chains 9. Preferably the wagon, if of sufficient length, is driven far enough to bring its front axle opposite the uprights B', in which case when elevated its body A will assume the angle shown in Fig. 2ᵃ. The conveyer C is next lowered into horizontal position in rear of the wagon-body. The horizontal chute 28 assumes a vertical position in this operation, so as to pass easily down and under the wagon-body. It being duly adjusted in position, the crank-shaft 16 (see Fig. 4) is rotated for taking up the rope 14, and thereby raising the elevator and the conveyer C, connected therewith, to the position required to duly engage the hinged chute 28 with the wagon-body and also to adjust and maintain the outer end of the elevator D at the required height to deliver the grain or other article to its destined receptacle. It will be understood that the lower end of the elevator D is suitably blocked up to support it in due position. The end-gate of the wagon-body being then removed the grain is free to flow over the chute 28 into the conveyer C. The next step is to raise the outer ends of the hinged track-sections 2. As before described, this is effected by means of the ropes 37 37ᵃ and the winding-shaft 39, when the latter is rotated through the medium of the gearing 40 42ᵃ, which operatively connects it with the driving-shaft 27. The operator, seizing the handle end of the rod 36, pushes thereon and throws the lever 45 backward, so that the clutch 44 engages the clutch 43 on the loose gear 42ᵃ, and the driving-shaft 27 being rotated by the motor it is apparent that through the gearing 40 the winding-shaft 39 will take up both ropes 37 37ᵃ, and thus elevate the track-sections 2, (see Figs. 2 and 2ᵃ,) whereby the front end of the wagon A is raised to such an elevation that the grain will flow or tend to flow out of the wagon-body by gravity into the conveyer C. So soon as the wagon-body has been thus elevated the clutch may be released by the operator; but ordinarily the release will be released automatically, as before described. So soon as the required elevation has been attained the winding-shaft 39 is locked, so as to hold the wagon-body in elevated position or inclination. The locking mechanism is illustrated in detail in Figs. 8 and 9. (See also Fig. 7.) The gear 40 is mounted on a counter-shaft 41, which is provided with a combined ratchet and brake wheel 47. A hand-lever 48 is attached to the upright B' and provided with three prongs. (See Figs. 8 and 9.) One of said prongs is the handle proper of the lever. The shortest prong 49 is adapted to engage the ratchet-wheel, and the longer and oppositely-curved prong 50 is adapted to engage the brake-wheel. It will be seen that when the lever is in the position shown in Fig. 8 it is not engaged with either the ratchet or the brake wheel portion; but by pushing the lever inward its pawl-prong 49 will engage the ratchet, and thus lock the shaft 41, and the latter being geared with the winding-shaft 39 will be locked also. The brake-prong 50 is brought into use only when the wagon has been unloaded and it is desired to lower the track-sections 2 to the horizontal or to their normal position. For this purpose the operator pulls the lever forward, thereby disengaging the pawl 49 from the ratchet and at the same time bringing the prong 50 into frictional engagement with the smooth-surfaced brake-wheel, whereby the descent of the track-sections 2 with front wheels of the wagon thereon is regulated. One of the universal joints 25 is illustrated in detail in Fig. 11. I propose to employ for this purpose any approved construction. It will be noted in Figs. 1, 2, and 7 that the uprights B' are not exactly vertical, but incline toward the front ends of the track-sections and that they are supported by suitable braces. This arrangement is preferred for the purpose of enabling the hoisting-ropes 37 37ª to run free.

By the means before described I form an efficient but simple and easily-transportable apparatus adapted to deliver grain, &c., from wagons into granaries, cars, and the holds of ships, or other receptacles.

Having thus described my invention, what I claim as new, and desire to secure by Letters Patent, is—

1. In a dumping and elevating apparatus, the combination of fixed and hinged track-sections and means for raising the outer ends of the hinged sections, a conveyer having an endless traveling belt and adapted for engagement with the rear end of the wagon-body, an elevator having an endless belt and connected with the conveyer and arranged at right angles thereto, shafts on which such endless belts run, and a tumbling-shaft having universal joints and connecting with the motor-shaft, the conveyer and elevator shafts, and track-hoist, as shown and described.

2. The combination with hinged track-sections, ropes connected therewith, fixed uprights provided with pulleys at their upper ends over which said ropes run, a winding-shaft to which the ropes are attached, a driving-shaft, and a counter-shaft arranged between it and the winding-shaft, a clutch applied to the driving-shaft, and gearing connecting the latter with the intermediate and winding shaft, a combined ratchet and brake wheel mounted on the intermediate shaft, and a lever having a pawl for engaging the ratchet, and an arm or prong for applying friction to the brake-wheel, substantially as shown and described.

3. The improved conveyer having a laterally-projecting chute which is pivoted as described, and a spring connected therewith and adapted for holding the chute pressed upward to engage a wagon-body, substantially as shown and described.

4. The conveyer having one of its sides cut out as described, a chute hinged therein and provided with side wings or end portions, a spring connected with one of said wings and tending to hold the chute canted upward, as shown and described.

5. The combination with the conveyer adapted to receive grain, &c., from the wagon-body and provided with an endless belt, of an elevator having notches formed in its inner end, a shaft arranged in said notches and forming the motor device for the endless belt of the conveyer, means for holding the said shaft removably in place, an endless belt in the elevator, a shaft over which the same travels, and means for connecting the two shafts, substantially as shown and described.

6. The combination with the conveyer and elevator, of a weighted rope attached to the free outer end of the conveyer and passing through a suitable guide on the elevator, substantially as shown and described.

7. The combination with the conveyer and elevator which are suitably jointed together, of means for supporting the conveyer in due position relative to a wagon-body, the same comprising a weighted rope connected with the free end of the conveyer, a vertical support connected with the elevator and having at its top a guide through which the weighted rope is rove, substantially as shown and described.

8. The combination with the conveyer having a side chute and means for supporting it elastically, of an elevator which is suitably hinged to the conveyer, and means for supporting the conveyer and pressing it upward against the wagon-body, the same consisting of a weighted rope rove through a suitable support on the elevator, substantially as shown and described.

9. The combination with the conveyer having a side chute, and means for supporting it elastically, of an elevator hinged to the conveyer, and a weighted rope connected with the outer end of the conveyer, and a bar secured to the elevator and having at its upper end a guide for the weighted rope, substantially as shown and described.

10. The combination with the conveyer and elevator hinged thereto, of a weighted rope connected with the outer end of the conveyer, and a bar pivoted to the side of the elevator, and means for holding it locked at different vertical inclinations, the weighted rope being passed through a guide at the top of the bar, substantially as shown and described.

11. The combination with a conveyer and elevator which are suitably connected, of means for supporting and adjusting the same vertically, and also for adjusting the elevator at different angles, which consists of sheers set astride the elevator, a pulley-block attached to the apex of the sheers, a rope passing through said block and connected at its respective ends with the end portions of the elevator, a winding-shaft for said rope, and means for locking the same, substantially as shown and described.

12. In a dumping apparatus, the combination, with the track-sections hinged together, the free sections having a cross-bar extended laterally as described, and an upright fixed alongside the track, of the mechanism for hoisting the hinged track-sections, which includes a clutch-lever pivoted on the upright and lying parallel thereto, its upper end projecting normally in rear of the upright for contact with the said cross-bar, as and for the purpose set forth.

PHILIP JACOB MAUGER.

Witnesses:
  MAXWELL HAMILTON,
  PHILIP TWINE.